United States Patent
Ho et al.

(10) Patent No.: US 11,736,764 B2
(45) Date of Patent: Aug. 22, 2023

(54) ARTIFICIAL INTELLIGENCE INFERENCE ON PROTECTED MEDIA CONTENT IN A VISION PROCESSING UNIT

(71) Applicant: Intel Corporation, Santa Clara, CA (US)

(72) Inventors: Nee Shen Ho, Bayan Lepas (MY); Tong Liang Chew, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 16/570,848

(22) Filed: Sep. 13, 2019

(65) Prior Publication Data

US 2020/0007931 A1    Jan. 2, 2020

(51) Int. Cl.
*H04N 21/4408* (2011.01)
*H04N 21/4405* (2011.01)
*H04N 21/4627* (2011.01)
*G06N 20/00* (2019.01)

(52) U.S. Cl.
CPC ......... *H04N 21/4408* (2013.01); *G06N 20/00* (2019.01); *H04N 21/44055* (2013.01); *H04N 21/4627* (2013.01)

(58) Field of Classification Search
CPC ......... H04N 21/4408; H04N 21/44055; H04N 21/4627; G06N 20/00
See application file for complete search history.

(56) References Cited

U.S. PATENT DOCUMENTS

2019/0012551 A1* 1/2019 Fung .................. G06V 10/82
2019/0188386 A1* 6/2019 Pogorelik ............... G06F 21/79

* cited by examiner

*Primary Examiner* — Hee K Song
(74) *Attorney, Agent, or Firm* — Essential Patents Group, LLP

(57) ABSTRACT

Techniques related to securely providing artificial intelligence inference on protected video content in a vision processing unit are discussed. Such techniques include decrypting encrypted video via a neural network processor of the vision processing unit by providing the neural network processor direct memory access to a security engine of the vision processing unit and applying a machine learning model to the decrypted video content using the neural network processor such that a host and other components of the vision processing unit do not have access to the decrypted video content.

20 Claims, 8 Drawing Sheets

ARTIFICIAL INTELLIGENCE INFERENCE ON PROTECTED MEDIA CONTENT IN A VISION PROCESSING UNIT

BACKGROUND

In the context of machine learning (ML) and artificial intelligence (AI) inference, inference may be performed on video frames to provide metadata such as inference outputs including probabilities of particular objects being identified in the video frames. Furthermore, in some contexts the video content is encrypted and decrypted in order to protect the copyrighted content. In some current techniques, an end-to-end software stack is used to perform protected content encryption and decryption, acting like a closed box solution. However, in such contexts AI inference on the protected video content may undesirably expose the content.

Such techniques use one or more central processing units (CPUs) to perform the encryption and decryption for video streams, therefore taking up CPU cycles. Furthermore, the end-to-end software stack is often proprietary, which means users are not able to implement commonly available software.

It may be desirable to accelerate machine learning and artificial intelligence inference for video processing while maintaining the protection of the protected media content during the inference processing. It is with respect to these and other considerations that the present improvements have been needed. Such improvements may become critical as the desire to perform machine learning and artificial intelligence inference on protected media content becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
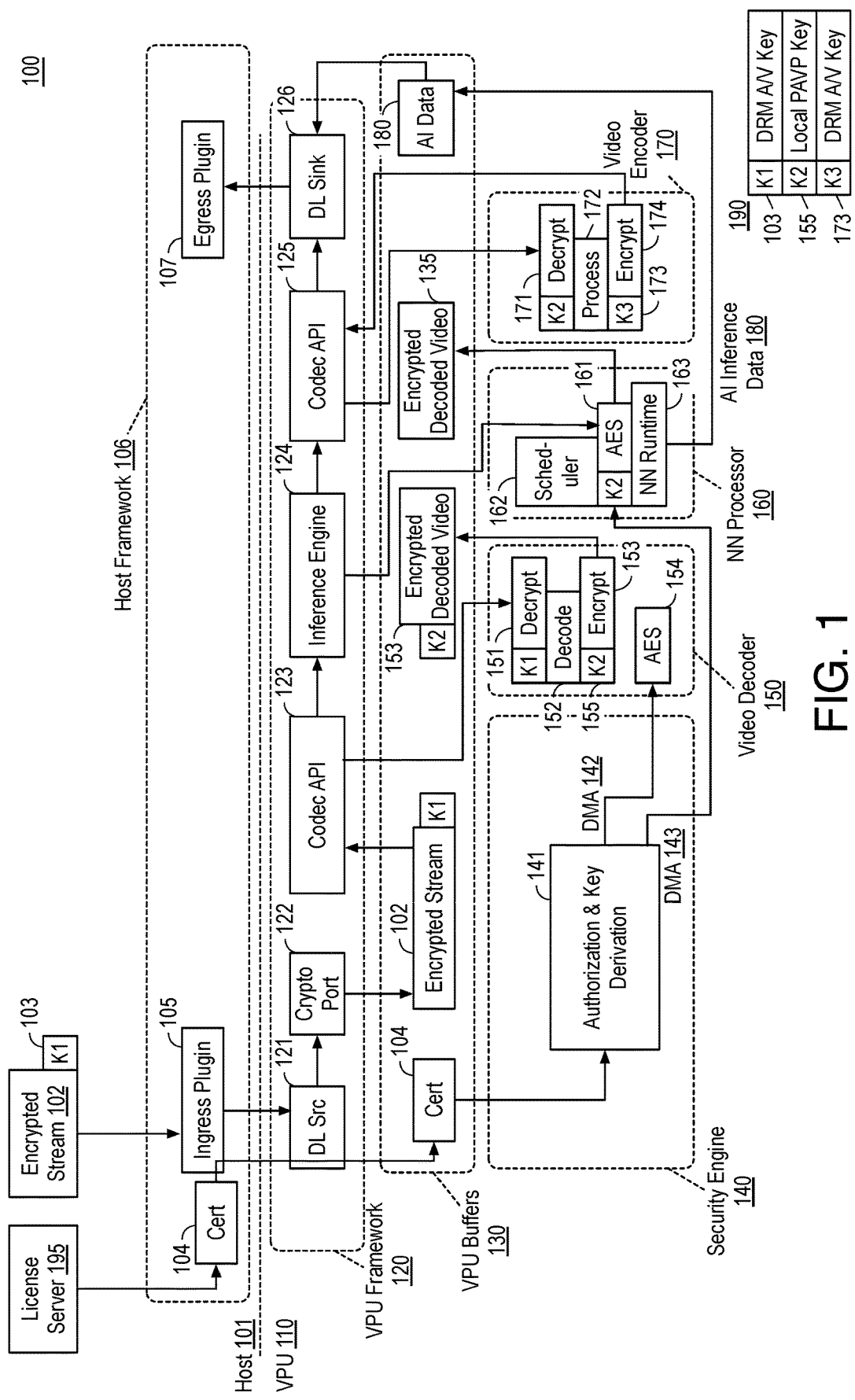
FIG. 1 is a block diagram of an exemplary system for performing artificial intelligence inference on protected media content in a vision processing unit.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation.

Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to artificial intelligence inference on protected media content in a vision processing unit.

A vision processing unit (VPU) is a specialized microprocessor used to accelerate machine learning and artificial intelligence inference for images and video. Such VPUs are distinct from graphics processing units, which are specialized to perform rasterization and texture mapping having a memory architecture optimized to manipulate bitmap images. In contrast, VPUs include specialized circuitry to perform neutral network processing on image or frame data such as raw image or frame data or similar data structures. Such VPUs may also include video decode and encode (codec) and/or video transcode capabilities such that the VPUs receive bitstreams and have the capability to decode the bitstream and apply the accelerated artificial intelligence inference model to the decoded video frame data. For example, the artificial intelligence inference model is trained using a training set of image and/or frame data having a particular format (e.g., raw image format, RGB format, YUV format, etc.) and the VPU uses the trained model to the implemented artificial intelligence inference on a video frame or image, which is generated by the codec (e.g., decode) capability of the VPUs.

The techniques discussed herein perform artificial intelligence processing (e.g., inference) on protected media content on a VPU such that the protected media content remains protected during the processing and such that the artificial intelligence processing is accelerated using hardware (e.g., a neural network processor of the VPU). In some embodiments, the artificial intelligence processing on protected media content uses an offload crypto service (OCS) engine in the VPU. As used herein, protected media content and similar terms refer to video streams that are encrypted to provide access control to proprietary hardware and copyrighted works. Notably, protected media content is typically premium media content that the owner or copyright holder wishes to not be disseminated or used without authorization. In some contexts, protected media content is copyrighted material. In other contexts, protected media content includes sensitive information such as when video is attained of a scene in working environments such as laboratories, office settings, or even stores. In such contexts, it is highly desirable to maintain control of the viewing of the protected media content. To such ends, exposure of unencrypted video to accessible memory, to a host system, etc. is highly undesirable as the protected media content may be copied and used without permission. As used herein, the term accessible memory indicates memory that is accessible to a host or system and one or more VPUs. For example, a buffer (i.e., memory) may be provided between a host and a VPU such that information is exchanged between the host and the VPU using the buffer with the host not having any other access to the VPU other than through the buffer. In such contexts, no unencrypted data (e.g., bitstream, decoded frames, etc.) representative of the protected media content is stored to the buffer. Only the VPU uses or accesses such unencrypted data to generate artificial intelligence parameters or data (and optionally a transcoded bitstream). Prior to storage to the buffer, any unencrypted data is always encrypted.

As used herein, the term artificial intelligence data, parameters, outputs, and other similar terms indicate output from a machine learning model such as a deep neural network, convolutional neural network, etc. Such artificial intelligence data may include any data structure representative of inferences made by the machine learning model such as likelihoods a frame includes a particular object (e.g., 0.8 cat, 0.1 dog, 0.1 false positive, etc.), locations of such objects, boundary boxes for such objects, and so on. The objects may include any number and types of particular objects such as animals, persons, automobiles, letters and numbers for license plate identification, and so on. Notably, the machine learning model may be pretrained for the particular implementation context.

The techniques discussed herein provide a closed box protected content processing for neural network (or other machine learning model) operations on protected media content video streams in a VPU to maintain security of the protected media content. In some embodiments, the discussed techniques maintain a Level 1 digital rights management (DRM) security level such that all content processing and cryptography are handled within hardware processor units that are associated with a Trusted Execution Environment (TEE) in accordance with the Digital Right Management (DRM) policies.

As discussed further herein, in some embodiments, a scheduler or dispatcher provides a firmware level component that manages frame level pipelining between multiple control blocks for neural network processing. In some embodiments, the scheduler or dispatcher has the ability to direct memory access (DMA) into a security engine within the VPU to decrypt and encrypt protected audio video path (PAVP) frames, acting like an advanced encryption standard (AES) block within the neural network compute engine. Secondly, the discussed techniques build in the security needed for a PAVP into the scheduler or dispatcher so that the video decryption application programming interface (API) will be seamless to the application layer. Finally, the discussed techniques implement the AES encryption and decryption capabilities built into the scheduler or dispatcher to advantageously provide a close box protected content processing environment.

The host and VPU architecture discussed herein may be implemented in any suitable context. In some embodiments, a network video recorder (NVR) takes video streams from multiple cameras via a communications channel or protocol such as through Ethernet connections to be processed and optionally stored. An example video processing implementation is to detect vehicle license plate letters and numbers or to identify objects in a scene. As such, vision processing using artificial intelligence is implemented in the network video recorder. To accelerate the artificial intelligence processing, multiple VPU accelerators may be connected to the host machine in the NVR system. Herein, a video stream coming into an artificial intelligence is a protected content, which is encrypted with Digital Rights Management (DRM). Such techniques may be employed when, for example, encrypted cameras are used to monitor sensitive areas.

FIG. 1 is a block diagram of an exemplary system 100 for performing artificial intelligence inference on protected media content in a vision processing unit, arranged in accordance with at least some implementations of the present disclosure. As shown, system 100 includes a host 101 and a vision processing unit (VPU) 110. Host 101 may include any computing system and may be described as a host system, host processing environment, etc. As shown, host 101 is illustrated as including a host framework 106, which may be implemented using any suitable processing units (e.g., CPUs, GPUs, etc.) and memory architectures. Notably, VPU framework 120 provides a framework, application protocol interface etc. for interface with VPU 110. Host framework 106 may implement an ingress plugin 105 and an egress plugin 107 used to communicate with VPU 110. For example, host 101 may provide data to VPU buffers 130 via ingress plugin 105 and may receive data from VPU buffers 130 via egress plugin 107.

VPU 110 includes a VPU framework 120, VPU buffers 130, a security engine 140, a video decoder 150 (also characterized as a video decode processor), a neural network (NN) processor 160, and a video encoder 170 (also characterized as a video encode processor). Notably, VPU framework 120 provides a framework, application protocol interface etc. for control and utilization of the hardware of VPU 110 including VPU buffers 130, security engine 140, video decoder 150, neural network processor 160, and video encoder 170. VPU buffers 130 may include any suitable memory implementation. In an embodiment, VPU buffers 130 are implemented using double data rate synchronous dynamic random-access memory (DDR SRAM). As shown, VPU buffers 130 are accessible to both host 101 and other hardware (e.g., security engine 140, video decoder 150, neural network processor 160, and video encoder 170) of VPU 110. VPU buffers 130 (e.g., memory) are accessible to VPU 110 and host 101, which are both communicatively coupled to the memory. The communicative coupling may be via any physical signaling (e.g., wiring or optical communication) using any suitable protocol. Notably, host 101 is not communicatively coupled to any other component of VPU 110 such that host 101 and VPU 110 are not communicatively coupled other than through VPU buffers 130 (e.g., the memory). Thereby, by maintaining encryption of any data corresponding to protected media content in VPU buffers 130, host 101 does not have access to any unencrypted data. Any such unencrypted data (e.g., an unencrypted bitstream, unencrypted video frames, etc.) are only processed in a secure environment using the hardware of VPU 110 (e.g., security engine 140, video decoder 150, neural network processor 160, and video encoder 170). Thereby, VPU 110 provides an advanced encryption standard trusted execution environment (AES TEE). In some embodiments, VPU 110 has a hardware separation via VPU buffers 130 from any process running on host 101 to provide the AES TEE. Notably, any hardware of host 101 is communicatively decoupled from VPU 110 except through the hardware implementation of VPU buffers 130.

As used herein, each of terms VPU buffers 130, security engine 140, video decoder 150 (or a video decode processor), neural network processor 160, and video encoder 170 (or a video encode processor) indicate hardware of VPU 110 including physical, tangible parts, modules, engines, components, etc. of VPU 110 such that the components have dedicated circuitry and are essentially unchangeable in the operations they perform without swapping out the part itself.

Such hardware components are contrasted with software or firmware modules or components that are relatively easily modified or changed since they are instructions stored in memory. For example, the software or firmware used to implemented VPU framework 120 may be modified while the operations performed by security engine 140, video decoder 150 (or a video decode processor), neural network processor 160, and video encoder 170 (or a video encode processor) indicate hardware of VPU 110 are unchangeable due to being inherent to the implemented circuitry of each component.

As shown, VPU 110 interfaces with host 101 to perform artificial intelligence inference on a received encrypted video stream 102. In some embodiments, VPU 110 includes a processor (not shown) to run operating systems and applications such as to perform the operations illustrated with respect to VPU framework 120. As discussed, the purpose of VPU 110 is to accelerate artificial intelligence inference (e.g., neural network operations) for received encrypted video stream 102 such that host 101 does not need to perform such operations (to save compute cycles on the host, for improved security, etc.). As such, VPU 110 includes video decoder 150, video encoder 170, neural network processor 160. The functions provided by VPU 110 include decode of video streams, acceleration of artificial intelligence inference (e.g., neural network processing) on the decoded video frames and providing artificial intelligence (AI) inference data (e.g., the metadata or answer corresponding to artificial intelligence inference algorithm) to host 101 for further action. VPU 110 includes security engine 140 having direct memory access based cryptography engines and secured key storage (and authorization, validation, etc.). Host 101, for example, may process a large number of encrypted streams (from multiple cameras in a network video recorder) and distribute the video streams into multiple VPUs. For example, FIG. 1 illustrates a single VPU 110 but any number may be implemented to interface with host 101 as illustrated herein with respect to FIG. 2.

Host 101 receives an encrypted bitstream, which is labeled as encrypted video stream 102. As shown, encrypted video stream 102 has a digital rights management key 103 corresponding thereto such that encrypted video stream 102 was encrypted based on digital rights management key 103. Herein, such encryption and decryption operations may be performed using any suitable cryptography algorithms, key architectures, key authorization techniques, etc. such as symmetric cryptographic techniques and/or any techniques implemented via DRM security measures. As shown, host 101 requests a certificate 104 from a DRM license server 195. Certificate 104 may have any suitable data format allowing for decryption of encrypted video stream 102. Certificate 104 is passed to an authorization and key derivation module 141 of security engine 140 in VPU 110. In some embodiments, certificate 104 is passed through to security engine 140 via deep learning source 121 of VPU framework 120 and ingress plugin 105 of host framework 106. In some embodiments, ingress plugin 105 and deep learning source 121 provide a deep learning source plug in or API that passes workloads between host 101 and VPU 110 (e.g., the accelerator). Certificate 104 contains the public key(s) used, in some embodiments, in security engine 140 to decrypt keys from encrypted video stream 102 (e.g., the content protected stream).

Furthermore, host 101 passes encrypted video stream 102 (e.g., which may be received from a camera of video network recorder) to VPU 110 through ingress plugin 105. In some embodiments, a crypto port plugin 122 (e.g., a content decryption module such as Widevine or cinema plugins) as implemented by VPU framework 120 of VPU 110 may manage DRM key(s) attached to encrypted video stream 102. As shown, encrypted video stream 102 and digital rights management key 103 are stored to VPU buffers 130. Thereby, an encrypted bitstream (encrypted video stream 102) representative of protected video content is received via VPU 110.

Encrypted video stream 102, as stored in VPU buffers 130 of VPU 110, is then passed via a codec API 123 (e.g., a framework to encode or decode video streams) to video decoder 150. Video decoder 150 (e.g., a video decode hardware unit) provides hardware acceleration of decode operations to generate decoded video frames from a video bitstream. Such decode may be performed using any suitable technique or techniques such as those defined by standardized video codecs including AVC, HEVC, etc. As discussed, the decode operations are hardware accelerated in VPU 110 via hardware video decoder 150.

Since encrypted video stream 102 is encrypted based on digital rights management key (K1) 103, encrypted video stream 102 is first decrypted based on digital rights management key 103 and/or keys from certificate 104 corresponding to encrypted video stream 102. In some embodiments, video decoder 150 accesses security engine 140 via AES module 154 using direct memory access (DMA) 142 in a cipher mode for security 140 engine to decrypt encrypted video stream 102 with a public key obtained from certificate 104. In some embodiments, video decoder 150 accesses security engine 140 via AES module 154 using direct memory access (DMA) 142 in a cipher mode for video decoder 150 to import the functionalities of security engine 140 to decrypt encrypted video stream 102 with a public key obtained from certificate 104. As used herein, the term direct memory access (DMA) indicates hardware subsystem (e.g., video decoder 150 and/or neural network processor 160) has access to security engine 140 (e.g., memory of security engine 140) independent of VPU framework 120 (which may be implemented by a CPU or other controller of VPU 110), independent of VPU buffers 130, and independent of any other hardware module of VPU 110. Notably, decryption and/or key access as provided by security engine 140 is only accessible by direct memory access using a channel dedicated to AES module 154, AES module 161, or any other AES module or engine of VPU 110 but such features are not accessible by VPU buffers 130, or any other hardware of VPU 110 such that no decryption may be performed that is not by or under supervision of security engine 140.

In some embodiments, encrypted video stream 102 is decrypted by security engine 140 such that video decoder 150 provides encrypted video stream 102 (e.g., as blocks of encrypted data) via DMA to security engine 140 and video decoder 150 receives a decrypted video stream via DMA from security engine 140. In some embodiments, encrypted video stream 102 is decrypted by video decoder 150 such that video decoder 150 imports the functionalities of security engine 140 to perform the decryption. In other embodiments, video decoder 150 accesses keys needed to decrypt encrypted video stream 102 from security engine 140 via DMA and performs decryption via hardware of video decoder 150. Once encrypted video stream 102 is decrypted as decrypted video stream 151, it is decoded by a hardware decoder 152 of video decoder 150 to generate one or more video frames. The video frames may be in any suitable format such as raw image format, RGB format, YUV format, etc.

As shown, the video frames are then encrypted using a local key 155 to generate encrypted decoded video 153. As with the discussed decryption operations, such encryption may be performed by security engine 140 via DMA using AES module 154 of video decoder 150 or by video decoder 150 using imported functionalities and/or keys accessed within security engine 140 via DMA using AES module 154. Local key 155 (K2) may be any suitable cryptographic key to be implemented using any cryptographic algorithms. In some embodiments, local key 155 provides a protected audio video path (PAVP) key. Encrypted decoded video 153 is then stored to VPU buffers 130 (e.g., memory) as encrypted decoded video 153 (e.g., as encrypted video frames). Notably, not decrypted data corresponding to encrypted video stream 102 is stored to VPU buffers 130 such that host 101 is not exposed to unencrypted data corresponding to protected media content.

As discussed, the encrypted bitstream (encrypted video stream 102) is decrypted based on digital rights management key 103 (e.g., using the key itself, a key corresponding thereto, or a key derived therefrom), the decrypted bitstream is decoded to generate video (decoded video) including any number of decoded frames in any suitable format, the decoded video is encrypted based on a local key (local key 155) to generate encrypted video, and the encrypted video is stored to memory (VPU buffers 130).

Encrypted decoded video 153 is then passed, via an inference engine interface 124 (e.g., an API), to neural network processor 160, which will accelerate an artificial intelligence inference algorithm implementation. As shown, using the techniques discussed herein, neural network processor 160 has access to security engine 140 through direct memory access (DMA) 143 to decrypt private key 155 so that neural network runtime 163 is able to perform the inference operation. DMA 143 into security engine 140 may act as if an AES engine is implemented as part of neural network processor 160. In some embodiments, neural network processor 160 includes a scheduler (or dispatcher) 162, which is a hardware or firmware component that manages the frame level pipeline. Scheduler 162 provides for control of decryption of encrypted decoded video 153 (e.g., a PAVP frame) through DMA 143 into security engine 140.

In some embodiments, AES module 161, under the control of scheduler 162, accesses security engine 140 using DMA 143 such that security engine 140 decrypts encrypted decoded video 153. As used herein, an AES module is any hardware that is capable of DMA to security engine 140 for security engine 140 to perform decryption and/or encryption. Such an AES module does not have the capability of performing decryption and may be contrasted with an AES engine which, as used herein, is any hardware that is capable of DMA to security engine 140 to attain authorized and/or authenticated keys and performs decryption and/or encryption itself. As discussed further herein below, video decoder 150, neural network processor 160, and video encoder 170 may implement AES modules and/or AES engines. Notably, security engine 140 only allows read access via channels dedicated to DMA such that no other read access may be made by any other component of VPU 110 or host 101.

For example, neural network processor 160 may pass, via DMA 143, encrypted decoded video 153 (e.g., blocks of encrypted data) to security engine 140, which decrypts encrypted decoded video 153 and passes, via DMA 143, decrypted video (not shown) for processing via neural network runtime 163. In an embodiment, decrypting encrypted decoded video 153 via neural network processor 160 includes scheduler 162 of neural network processor 160 providing encrypted decoded video 153 to security engine 140 of VPU 110 via DMA 143 for security engine 140 to perform the decryption and to receive decrypted video via DMA 143. In some embodiments, decryption by security engine 140 is only accessible by DMA using a channel dedicated to AES module or an AES engine of VPU 110. As shown in FIG. 1, decryption operations and outgoing key transfers are only accessible via a channel over which DMA may be performed with no other outgoing channels from security engine 140 being available from security engine.

In some embodiments, an AES engine (not shown in FIG. 1) of neural network processor 160 accesses security engine 140 via DMA 143 to access local key 155 (or information corresponding to or based on local key 155) for decryption of encrypted decoded video 153. In other embodiments, the AES engine of neural network processor 160 accesses security engine 140 via DMA 143 to import functionalities of security engine and/or to access local key 155 (or information corresponding to or based on local key 155) for to perform decryption of encrypted decoded video 153 in accordance with the imported functionalities. As used herein, the terms functionalities, importing functionalities and other similar terms indicate cryptographic instructions, cryptographic algorithms, cryptographic data, or other information needed to perform decryption locally. Such instructions, algorithms, data, or other information may be kept secure by security engine 140 and only accessed via a DMA engine of NN processor 160 (or video decoder 150 or another hardware module of VPU 110. The AES engine of neural network processor 160 then performs decryption of encrypted decoded video 153 based on local key 155.

Once encrypted decoded video 153 is decrypted (e.g., once a frame is decrypted), the video frame (in any suitable format as discussed) it is sent directly into neural network runtime 163 to perform vision processing (e.g., inference operation). As used herein, the term neural network runtime indicates hardware used to apply a machine learning artificial intelligence inference model to the video frame. Neural network runtime 163 may load the decrypted frame and a machine learning model for application of the machine learning model to the decrypted frame to generate artificial intelligence inference data 180. The applied machine learning model may be any suitable model such as a deep neural network model, a convolutional neural network model, etc. Artificial intelligence inference data 180 may include any suitable data and data structure as discussed such as probabilities of particular objects being identified, their locations etc. In an embodiment, the model has a particular number of available categorizations and artificial intelligence inference data 180 includes a scoring (e.g., probability) for each categorization or a top few scoring categorizations or the like. Artificial intelligence inference data 180 (e.g., the data from the neural network inference) is sent to host 101 as meta data corresponding to the particular processed frame. As shown, in some embodiments, artificial intelligence inference data 180 may be passed to VPU buffers 130 and then accessed by host 101 using egress plugin 107 (or another plugin) and deep learning sink 126 of VPU framework 120.

The decrypted frame may then be optionally encrypted with local key 155 and stored in VPU buffers 130 as encrypted decoded video 135, if needed. Such encryption may be performed by security engine 140 as discussed using DMA 143 via AES module 161 or by an AES engine of neural network processor 160, as discussed above with respect to local decryption. In some embodiments, the decrypted frame (and all decrypted video attained at neural network processor 160) is discarded after application of the machine learning model by neural network processor 160.

Furthermore, depending on the use case of system 100, encrypted decoded video 153 or encrypted decoded video 135 may go through video encoder 170 (e.g., a hardware accelerator encoder) to be encoded (e.g., in a jpeg format) to be sent into the host for further action. For example, encrypted decoded video 135 may be provided via codec API 125 to video encoder 170. To perform hardware encode via video encoder 170, the encrypted decoded video is decrypted using local key 155 (via AES access to security engine 140 or local decryption 171), then provided to a hardware video encode processor 172 (e.g., a hardware jpeg encoder). Once encoded, the bitstream (e.g., video stream) is encrypted using a second digital rights management key 173 (K3) and DRM license server 195 is updated with the corresponding public key. The encryption may be performed via AES access to security engine 140 or local encryption 174. Such techniques may provide a transcoding capability for system 100 such that encrypted video stream 102 may be in a first format and a second format is provided for ease of storage, higher compression, etc. and using a second and potentially more secure DRM key. As shown with respect to table 190, digital rights management key 103 (DRM audio/video key), local key 155 (local protected audio video path key), and digital rights management key 173 (DRM audio/video key) may be used for encryption/decryption herein.

Thereby, a secure environment is provided for performing artificial intelligence inference on protected media content in a vision processing unit such that the protected media content is not revealed to a host in an unencrypted form. Such an architecture provides an advanced encryption standard trusted execution environment having a hardware separation from any process running on the host. The discussed architecture may be provided in any suitable use case.

Figure 2:
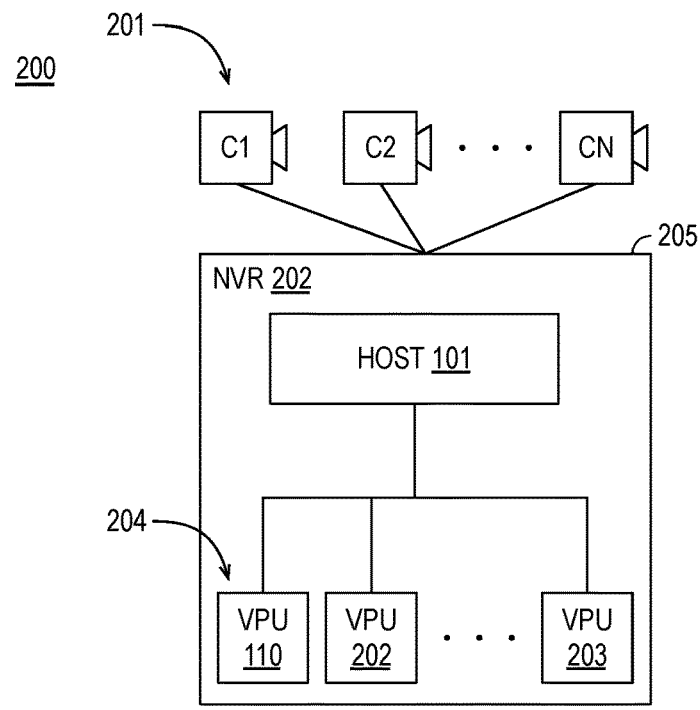
FIG. 2 is a block diagram of an exemplary network video recorder system for performing artificial intelligence inference on protected media content in a vision processing unit.

FIG. 2 is a block diagram of an exemplary network video recorder system 200 for performing artificial intelligence inference on protected media content in a vision processing unit, arranged in accordance with at least some implementations of the present disclosure. As shown, network video recorder (NVR) system 200 includes any number of cameras 201 communicatively coupled to a network video recorder 202. Network video recorder 202 implements host 101 and any number of VPUs 204 including VPU 110, VPU 202, VPU 203, and so on within a housing 205. Network video recorder 202 may be any form factor device and may include other input and output devices. In some embodiments, host 101 and VPUs 204 are implemented as separate monolithic integrated circuits on a shared motherboard. As used herein the term housing indicates an exterior case or enclosure used to protect interior devices. A housing typically is entirely enclosed with the exception of I/O ports. Furthermore, the term monolithic integrated circuit indicates a number of circuits integrated onto a shared substrate. Such monolithic integrated circuits may each be attached to a motherboard and interconnected.

In some embodiments, each of cameras 201 attains video of a scene, encodes the video, and encrypts the resultant bitstream to generate an encrypted video stream such as encrypted video stream 102. For example, NVR system 200 may be implemented at an intersection to monitor automobiles (e.g., with AI processing to identify vehicle plate numbers), within a store to monitor people movement (e.g., with AI processing to identify persons and track their presence within particular areas), within a laboratory or other secure work environment (e.g., with AI processing to monitor people movement and secure access), and so on. Notably, protecting the resultant media content (e.g., video) is desirable in such contexts to maintain secrecy, security, and so on such that the protected media content is only accessed in unencrypted form as needed, in a supervised environment, and so on.

The resultant encrypted video streams are then processed as discussed with respect to FIG. 1 such that host 101 passes encrypted video streams to VPUs for secure performance of AI inference using video decrypted and decoded from the encrypted video streams. In some embodiments, each of VPUs 204 are provided as discrete monolithic integrated circuits such that decrypted video data corresponding to the encrypted video streams are only available to the particular discrete monolithic integrated circuit and no other component of NVR system 200 may access the video data in unencrypted form.

Figure 3:
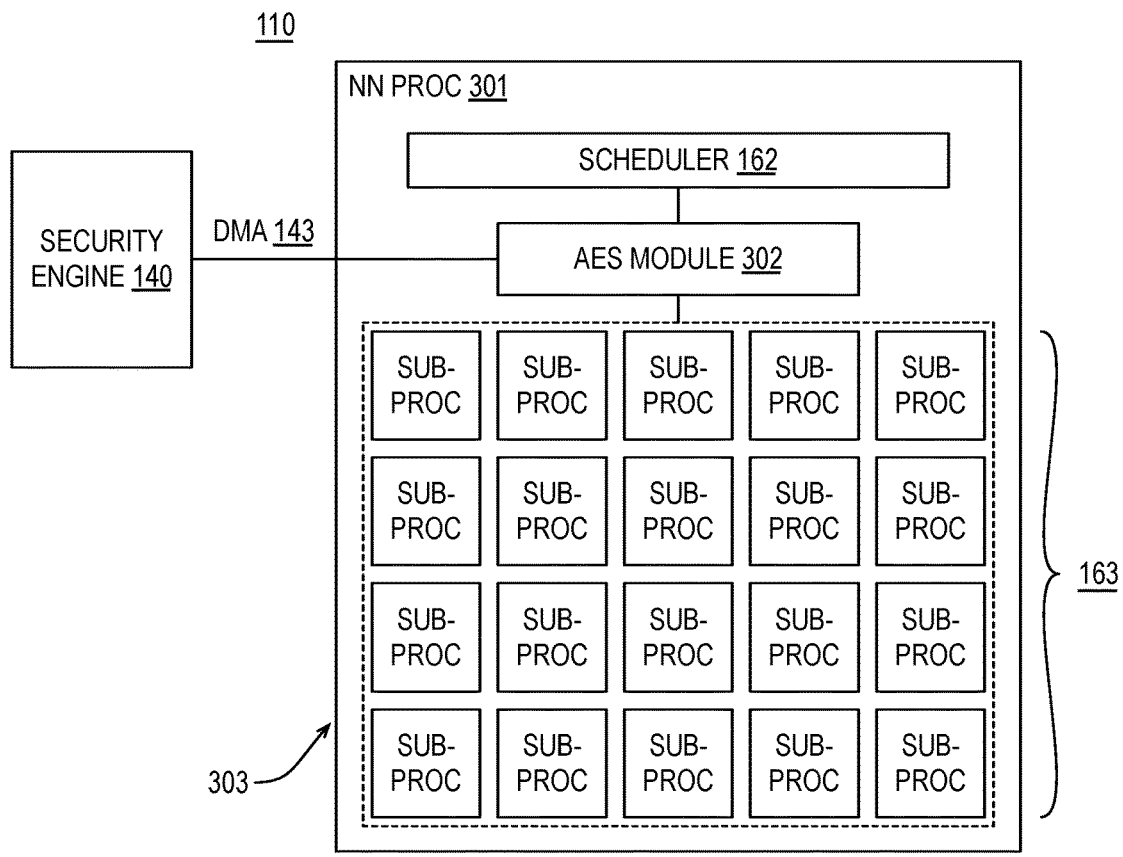
FIG. 3 is a block diagram of an exemplary neural network processor of a vision processing unit.

FIG. 3 is a block diagram of an exemplary neural network processor 301 of a vision processing unit, arranged in accordance with at least some implementations of the present disclosure. For example, neural network processor 301 may be implemented as neural network processor 160. As discussed, in some embodiments, neural network processor 301 attains DMA 143 to security engine 140 such that security engine performs decryption of encrypted decoded video 153 under DMA 143 in a cipher mode, for example. In such embodiments, scheduler 162 may control AES module 302 to provide encrypted decoded video 153 to security engine 140 for decryption (e.g., as blocks of decrypted data) such that security engine 140 acts as a calculator that applies decryption and returns the decrypted video.

In such embodiments, AES module 302 may receive the decrypted video, assemble it as needed, and provide it directly to neural network runtime 163. As shown, in some embodiments, neural network runtime 163 is implemented as any number of neural network sub-processors 303 such that neural network sub-processors 303 are circuits dedicated to application of a particular machine learning model. Neural network sub-processors 303 receive a decrypted video frame and machine learning model parameters (e.g., neural network parameters) and apply the machine learning model to the decrypted video frame to generate artificial intelligence inference data 180. That is, applying a neural network by neural network processor 301 may be performed by neural network sub-processors 303.

In order to provide the security discussed herein, AES module 302 and neural network sub-processors 303 are tightly coupled such that the decrypted video is provided directly from AES module 302 to neural network sub-processors 303 (e.g., one or more of neural network sub-processors 303), no other component of VPU 110 may access the decrypted video, and the decrypted video is not stored to VPU buffers 130. In some embodiments, AES module 302 and neural network sub-processors 303 are directly coupled such that decrypted video is passed directly from AES module 302 to neural network sub-processors 303 using a bus or other interconnect circuitry (not shown) dedicated to such transfers (e.g., a dedicated AES engine 402 to neural network sub-processors 303 bus). Furthermore, as discussed, the decrypted video may be discarded after processing is performed by the neural network sub-processors 303.

Figure 4:
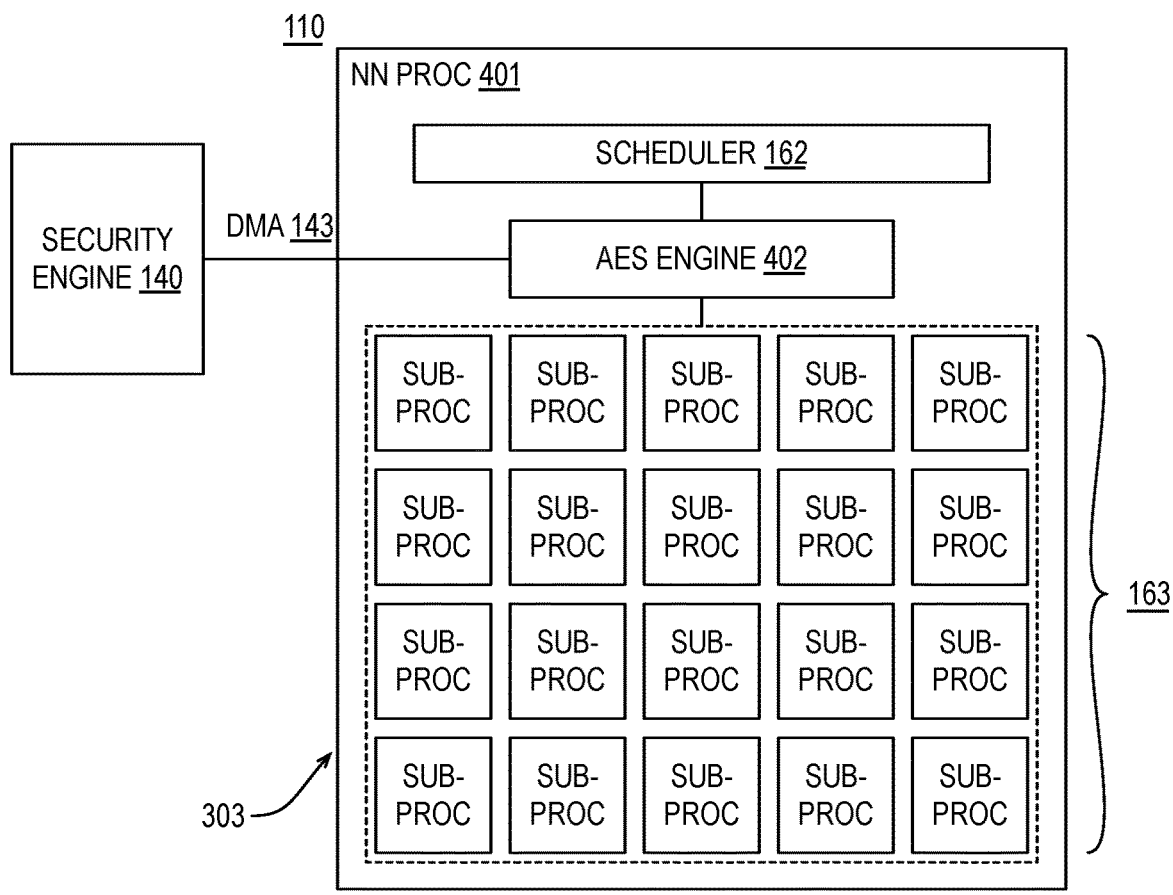
FIG. 4 is a block diagram of another exemplary neural network processor of a vision processing unit.

FIG. 4 is a block diagram of another exemplary neural network processor 401 of a vision processing unit, arranged in accordance with at least some implementations of the present disclosure. For example, neural network processor 401 may be implemented as neural network processor 160. As discussed, in some embodiments, neural network processor 401 attains DMA 143 to security engine 140 such that security engine provides functionalities (cryptographic instructions, cryptographic algorithms, cryptographic data) and/or the cryptographic key (local key 155) or a data structure corresponding thereto for decryption of encrypted decoded video 153 under DMA 143 in a cipher mode. Neural network processor 401 may then use the cryptographic key to perform the decryption of encrypted decoded video 153 using AES engine 402. As discussed, AES engine 402 may be contrasted with AES module 302 in that AES engine 402 includes circuitry to perform decryption while an AES module only has circuitry to DMA to security engine 140. In such embodiments, scheduler 162 may control AES engine 402 to attain the necessary key(s) for decryption and AES engine 140 performs decryption (e.g., on blocks of decrypted data).

In such embodiments, decrypting the encrypted video via neural network processor 401 includes accessing security engine 140 of VPU 110 via DMA 143. Security engine 140 provides local key 155, or data corresponding thereto to AES engine 402 of neural network processor 401 for neural network processor 401 to perform the decryption. As discussed, the key retrieval from security engine 140 is only accessible by direct memory access using a channel dedicated to one or more advanced encryption standard modules or engines of VPU 110.

In order to provide the security discussed herein, AES engine 402 and neural network sub-processors 303 are tightly coupled, as discussed with respect to FIG. 3, such that the decrypted video is provided directly from AES engine 402 to neural network sub-processors 303 (e.g., one or more of neural network sub-processors 303), no other component of VPU 110 may access the decrypted video, and the decrypted video is not stored to VPU buffers 130. In some embodiments, AES engine 402 and neural network sub-processors 303 are directly coupled such that decrypted video is passed directly from AES engine 402 to neural network sub-processors 303 using a bus or other interconnect circuitry (not shown) dedicated to such transfers (e.g., a dedicated AES engine 402 to neural network sub-processors 303 bus). Furthermore, as discussed, the decrypted video may be discarded after processing is performed by the neural network sub-processors 303.

Figure 5:
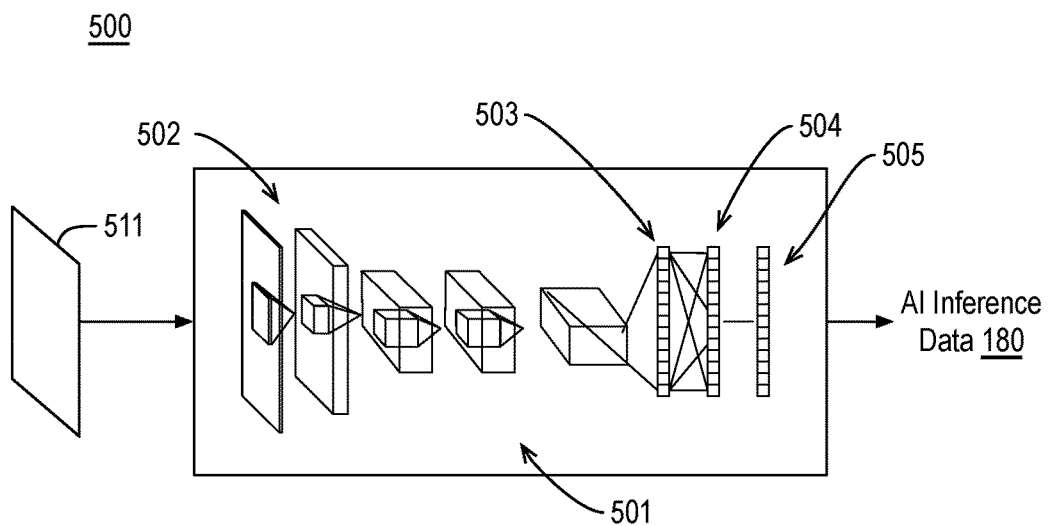
FIG. 5 illustrates an exemplary machine learning model for application to a decrypted video frame to generate artificial intelligence inference data.

FIG. 5 illustrates an exemplary machine learning model 500 for application to a decrypted video frame 511 to generate artificial intelligence inference data 180, arranged in accordance with at least some implementations of the present disclosure. Machine learning model 500 may include any suitable CNN, RNN, or DNN. As discussed, decrypted video frame 511 includes a video frame in any suitable format such as raw image format, RGB format, YUV format, a luma only format, etc. In some embodiments, neural network processor 160 applies a machine learning model 500 (CNN, RNN, DNN, etc.) to decrypted video frame 511 to generate artificial intelligence inference data 180. In the illustrated example, machine learning model 500 includes a deep learning neural network (DLNN) 501. However, any suitable machine learning model may be used.

As shown, in some embodiments, DLNN 501 implements a number of convolutional layers 502. Each convolutional layer 502 of DLNN 501 receives decrypted video frame 511 or a preceding set of feature maps from a previous layer and each convolutional layer applies a predetermined number of convolution kernels having a predetermined size and stride to the incoming data to generate feature maps. Each convolutional layer 502 may also optionally include or be followed by various combinations of rectified linear units (ReLU), max pooling operations, and/or local response normalization (LRN) operations, as is known in the art, to generate the discussed feature maps. Furthermore, each convolutional layer 502 is pretrained and implements suitable parameters for artificial intelligence inference.

Furthermore, DLNN 501, after convolutional layers 502, may include a flattening layer 503 to transpose the final feature maps of the convolutional layers to a vector and a fully connected layer 504 to determine classifications or probabilities of various objects, letters/numbers, or other machine vision results, which are provided from output layer 505 of DLNN 501 as artificial intelligence inference data 180. Based on the pre-training of DLNN 501, artificial intelligence inference data 180 are generated and used in the context of system 100, NVR system 200, or any other suitable context discussed herein.

Figure 6:
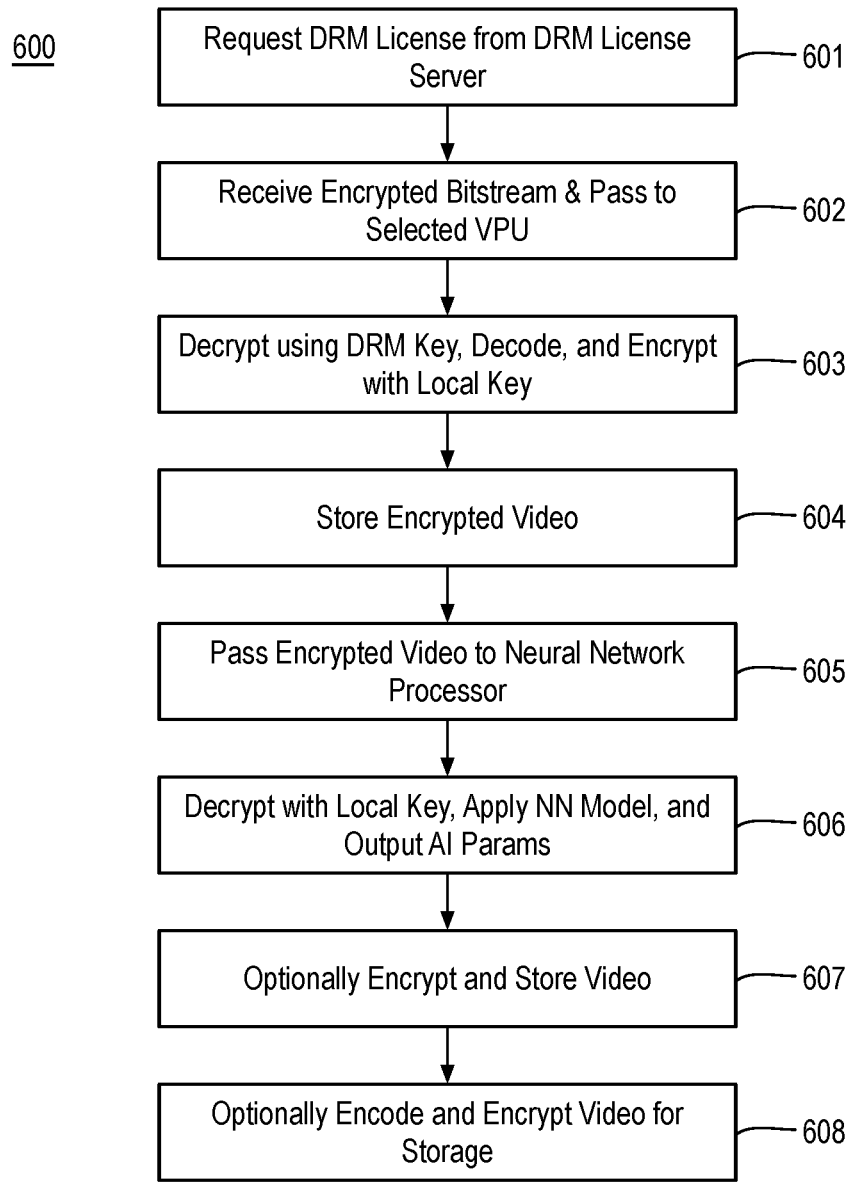
FIG. 6 illustrates an example process for performing artificial intelligence inference on protected media content in a vision processing unit.

FIG. 6 illustrates an example process 600 for performing artificial intelligence inference on protected media content in a vision processing unit, arranged in accordance with at least some implementations of the present disclosure. Process 600 may include one or more operations 601-608 as illustrated in FIG. 6. For example, operations 601 and 602 may be performed by host 101 and operations 603-606 may be performed by VPU 110.

Process 600 begins at operation 601, where a DRM license corresponding to protected media content is requested by host 101 from DRM license server 195. Processing continues at operation 602, where an encrypted bitstream corresponding to the protected media content is received and passed to a selected VPU by host 101. For example, host 101 may select a particular VPU of any number of VPUs to process the received encrypted bitstream. The encrypted bitstream may be encrypted using any suitable cryptographic techniques and may be compressed using any suitable video compression techniques. In some embodiments, the bitstream is a standards compliant bitstream such as an AVC compliant bitstream, an HEVC compliant bitstream etc.

Processing continues at operation 603, where the encrypted bitstream is decrypted based on a DRM key contained in the DRM license, the decrypted bitstream is decoded, and the resultant video (e.g., video frames) is encrypted with a local key. As discussed herein, such decryption and encryption may be performed by video decoder 150 attaining DMA access to security engine 140 such that security engine 140 performs the decryption and encryption or the decryption and encryption may be performed by video decoder 150 after attaining the required and authenticated key(s) via DMA access.

Processing continues at operation 604, where the encrypted video generated at operation 603 is stored to a memory buffer that is accessible to both the VPU (and may be on board the VPU) and the host. Notably, the host is given access only to encrypted data and not decrypted data to provide a secure environment as discussed herein.

Processing continues at operation 605, where the encrypted video is passed to the neural network processor for decryption and artificial intelligence inference. Processing continues at operation 606, where the encrypted video is decrypted based on the local key, an artificial intelligence model (such as a neural network) is applied to the decrypted video, and the resultant artificial intelligence parameters (e.g., object detection probabilities, etc.) are provided. As discussed herein, such decryption and encryption may be performed by neural network processor 160 attaining DMA access to security engine 140 such that security engine 140 performs the decryption and encryption or the decryption and encryption may be performed by neural network processor 160 after attaining the required and authenticated key(s) via DMA access. In any event, the resultant artificial intelligence parameters are provided to the host via the buffer memory such that the resultant artificial intelligence parameters need not be encrypted.

Processing continues at operation 607, where the decrypted video is optionally encrypted and stored and/or at operation 608, where the decrypted video is optionally encoded, encrypted, and stored. As discussed, in some embodiments, a VPU may provide a transcoding capability such that the incoming encrypted bitstream may be stored as an encrypted bitstream with the underlying bitstream being encoded using a different codec, at a different compression rate and therefore different quality, etc. For example, it may be desirable to store the video at a higher compression rate and lower quality to save memory resources. In an embodiment, the compression rate is responsive to whether any positive artificial intelligence parameters were found at operation 606. In an embodiment, when no artificial intelligence parameters (e.g., no detected objects) were found, the video is stored at a highest compression rate and when artificial intelligence parameters (e.g., positive object detection) were found, the video is stored at a lower compression rate (e.g., having lower compression and therefore a higher bitrate).

As discussed, in some embodiments, the decryption performed via neural network processor 160 is provided by neural network processor 160 attaining DMA access to security engine 140 (e.g., via an AES module of neural network processor 160) and security engine 140 performing the decryption, and the same may be true of encryption performed via neural network processor 160. Such techniques are discussed further with respect to FIG. 7. Furthermore, in some embodiments, the decryption performed via neural network processor 160 is provided by neural network processor 160 (e.g., via an AES engine of neural network processor 160) after attaining the necessary keys via DMA access to security engine 140. Such techniques are discussed further with respect to FIG. 8 below.

Figure 7:
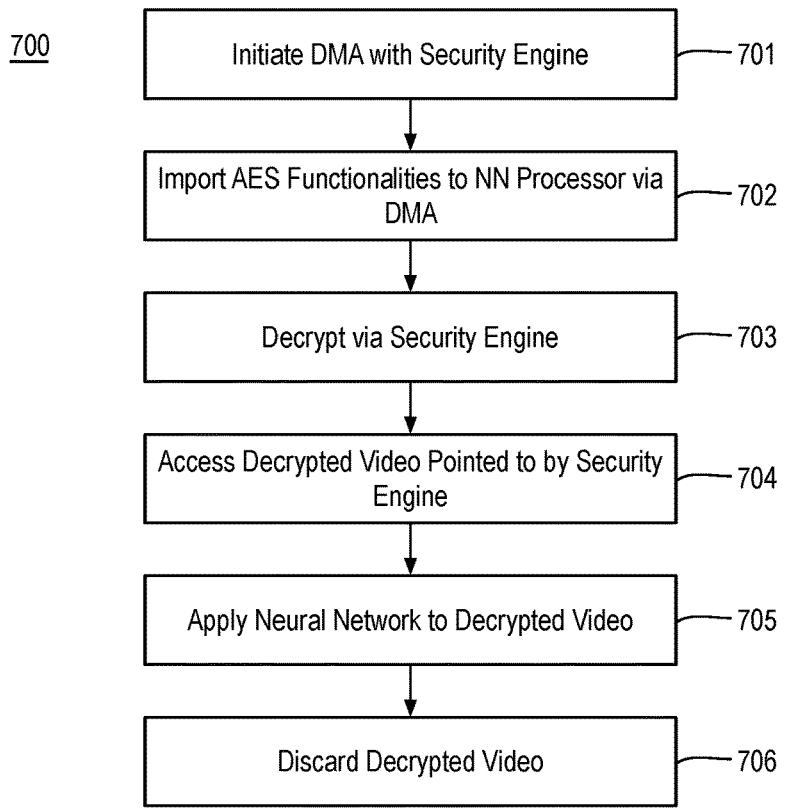
FIG. 7 illustrates an example process for performing decryption and artificial intelligence on encrypted video via a vision processing unit.

FIG. 7 illustrates an example process 700 for performing decryption and artificial intelligence on encrypted video via a vision processing unit, arranged in accordance with at least some implementations of the present disclosure. Process 700 may include one or more operations 701-706 as illustrated in FIG. 7. For example, operations 701, 702, and 704-706 may be performed by neural network processor 160 and operation 703 may be performed by security engine 140.

Process 700 begins at operation 701, where neural network processor 160 initiates a DMA session with security engine 140. The DMA session may be under any suitable protocol such that neural network processor 160 and security engine 140 are able to communicate and/or neural network processor 160 is able to access security engine 140 independent of any central processor or controller of VPU 110 as well as being independent of VPU buffers 130 and any other hardware module of VPU 110. Thereby, a highly secure communication channel is established between neural network processor 160 and security engine 140.

Processing continues at operation 702, where neural network processor 160 imports security engine 140 functionalities via the DMA session. The encrypted video may be accessible using any suitable technique or techniques from the imported functionalities. In some embodiments, the encrypted video is accessible as blocks of encrypted data representative of the encrypted video for decryption. The blocks of encrypted data may include a particular data size for example that the security engine 140 functionalities may be capable of decrypting.

Processing continues at operation 703, where security engine 140 decrypts the encrypted data based on the local key to generate decrypted video. The decryption may be based on any suitable cryptographic techniques. Processing continues at operation 704, where neural network processor 160 receives decrypted video via the DMA session to security engine 140. As discussed the DMA session provides a secure channel such that data may only be received from security engine 140 via a channel supported by a DMA session and no other hardware may otherwise access data from security engine 140.

Processing continues at operation 705, where neural network processor 160 applies a machine learning model such as a neural network to the received secure decrypted video to generate artificial intelligence inference conclusions based on the decrypted video. The machine learning model may be any suitable model. Notably, the module of neural network processor 160 that receives the decrypted video (e.g., an AES hardware module under control of a scheduler) is tightly coupled to the machine learning hardware module (e.g., NN runtime) such that the received secure decrypted video is provided directly from the AES hardware to the machine learning hardware such that no other hardware may access the secure decrypted video. In some embodiments, the direct connection is made without any memory storage therebetween. In some embodiments, output circuitry of the AES hardware is directly coupled (e.g., via bus, wiring, interconnect circuitry, etc.) to the machine learning hardware.

Processing continues at operation 706, where the decrypted video may optionally be discarded by the neural network processor 160. For example, neural network processor 160 may not store the decrypted video to memory nor pass the decrypted video to another component of the VPU such that the decrypted video is discarded or lost from neural network processor 160. Such discarding may be optional as, in other embodiments, the decrypted video may be re-encrypted as discussed herein.

Figure 8:
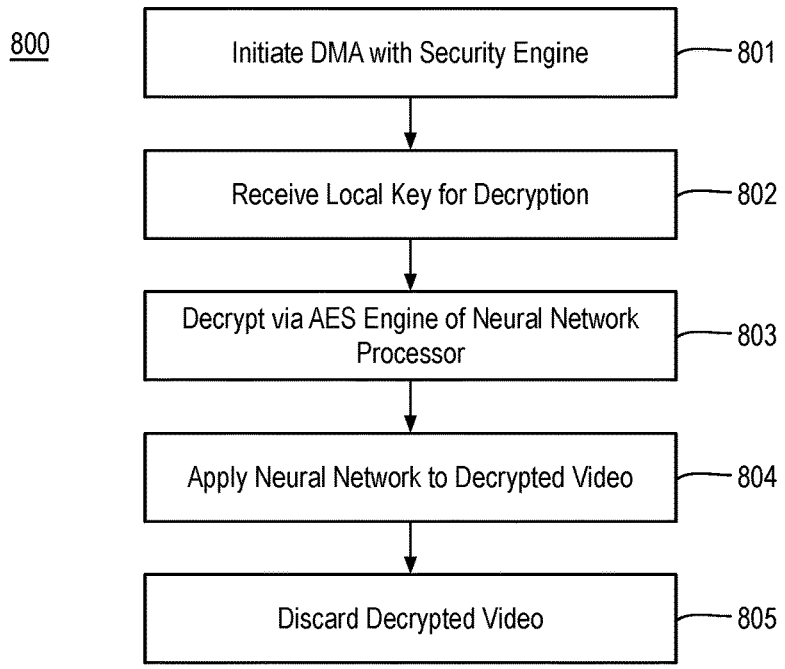
FIG. 8 illustrates another example process for performing decryption and artificial intelligence on encrypted video via a vision processing unit.

FIG. 8 illustrates another example process 800 for performing decryption and artificial intelligence on encrypted video via a vision processing unit, arranged in accordance with at least some implementations of the present disclosure. Process 800 may include one or more operations 801-805 as illustrated in FIG. 8. For example, operations 801-805 may be performed by neural network processor 160.

Process 800 begins at operation 801, where neural network processor 160 initiates a DMA session with security engine 140. As with operation 701, the DMA session may be under any suitable protocol such that neural network processor 160 and security engine 140 are able to communicate and/or neural network processor 160 is able to access security engine 140 independent of any central processor or controller of VPU 110 as well as being independent of VPU buffers 130 and any other hardware module of VPU 110 to provide a highly secure communication channel between neural network processor 160 and security engine 140.

Processing continues at operation 802, where neural network processor 160 receives a local key or corresponding information for decryption of the encrypted video. For example, neural network processor 160 may receive the local key itself, a decryption key corresponding to the local key, data corresponding to the local key, or any other data structure for the decryption of the encrypted video. The local key or other information for decryption is received via the DMA session such that such that data may only be received from security engine 140 via a channel supported by a DMA session and no other hardware may otherwise access data from security engine 140.

Processing continues at operation 803, where neural network processor 160 decrypts the encrypted video data based on the local key to generate decrypted video. The decryption may be based on any suitable cryptographic techniques. The decryption performed by neural network processor 160 is provided by an AES engine of neural network processor 160 such that the AES engine has circuitry dedicated to decryption and/or encryption. Notably, the DMA session provides a secure channel such that the local key (or other data) is received securely and the AES engine applies decryption locally such that no other hardware of the VPU may access the decrypted video data or the local key.

Processing continues at operation 804, where neural network processor 160 applies a machine learning model such as a neural network to the secure decrypted video to generate artificial intelligence inference conclusions based on the decrypted video, as discussed with respect to operation 705. The AES engine of neural network processor 160 that decrypts the video content (e.g., an AES hardware engine) is tightly coupled to the machine learning hardware (e.g., NN runtime) such that the secure decrypted video is provided directly from the AES hardware to the machine learning hardware with no other hardware having access to the decrypted video data. As with the previously discussed AES module, in some embodiments, the direct connection between the AES engine and the machine learning hardware is made without any memory storage therebetween. In some embodiments, output circuitry of the AES hardware engine is directly coupled (e.g., via bus, wiring, interconnect circuitry, etc.) to the machine learning hardware.

Processing continues at operation 805, where the decrypted video may optionally be discarded by the neural network processor 160 as discussed with respect to operation 706. For example, neural network processor 160 may not store the decrypted video to memory nor pass the decrypted video to another component of the VPU such that the decrypted video is discarded or lost from neural network processor 160.

Figure 9:
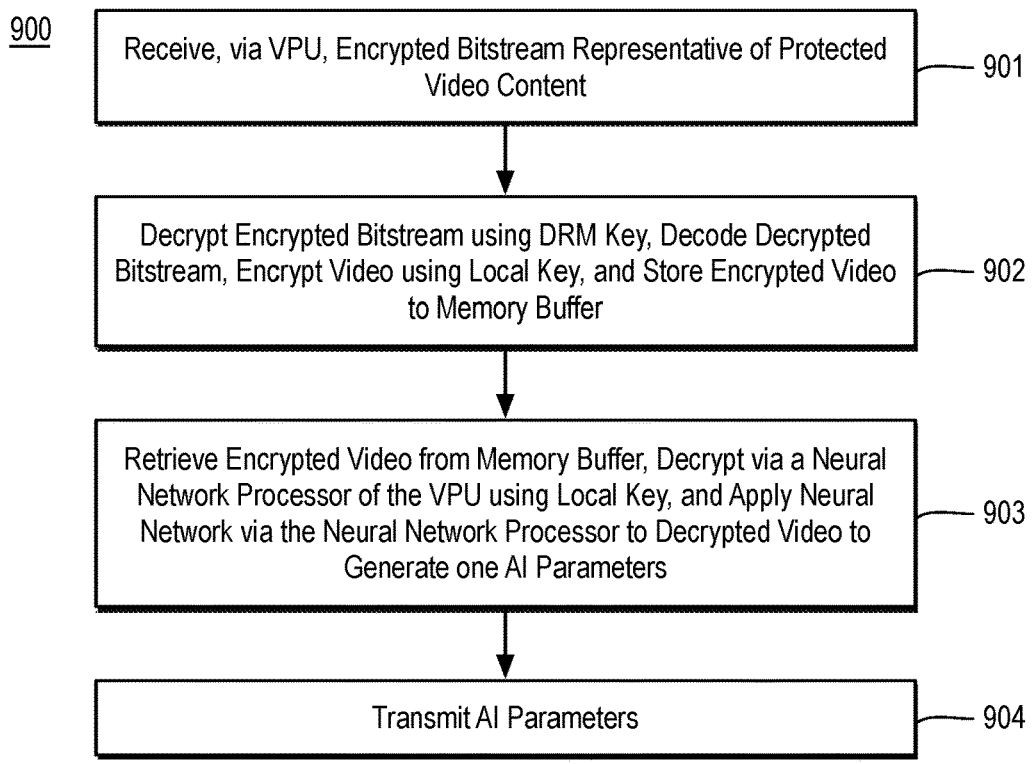
FIG. 9 is a flow diagram illustrating an example process for performing artificial intelligence inference on protected media content in a vision processing unit.

FIG. 9 is a flow diagram illustrating an example process 900 for performing artificial intelligence inference on protected media content in a vision processing unit, arranged in accordance with at least some implementations of the present disclosure. Process 900 may include one or more operations 901-904 as illustrated in FIG. 9. Process 900 may form at least part of an artificial intelligence inference process. By way of non-limiting example, process 900 may form at least part of an artificial intelligence inference process as performed by system 100 as discussed herein. Furthermore, process 900 will be described herein with reference to system 1000 of FIG. 10.

Figure 10:
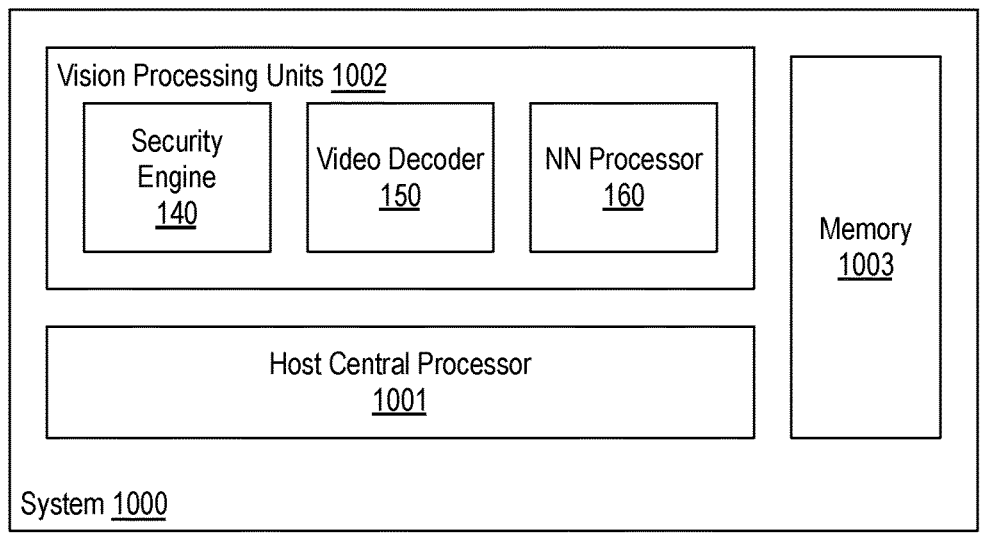
FIG. 10 is an illustrative diagram of an example system 1000 for performing artificial intelligence inference on protected media content in a vision processing unit.

FIG. 10 is an illustrative diagram of an example system 1000 for performing artificial intelligence inference on protected media content in a vision processing unit, arranged in accordance with at least some implementations of the present disclosure. As shown in FIG. 10, system 1000 may include a host central processor 1001, any number of vision processing units 1002, and a memory 1003 Also as shown, each vision processing units 1002 may include or implement security engine 140, video decoder 150, and neural network processor 160. Each of vision processing units 1002 may also implement memory (e.g., VPU buffers 130) or such buffers may be implemented using memory 1003. In the example of system 1000, memory 1003 may store encrypted video data as discussed herein.

As shown, in some examples, security engine 140, video decoder 150, and neural network processor 160 are implemented via each of vision processing units 1002. In other examples, video encoder 170 is also implemented via each of vision processing units 1002. In some embodiments, each of vision processing units 1002 are implemented in hardware. In some embodiments, each of vision processing units 1002 are implemented in hardware as a system-on-a-chip (SoC). In some embodiments, each of vision processing units 1002 are implemented in hardware are implemented in hardware via a FPGA.

Each of vision processing units 1002 may include any hardware modules as discussed herein and memory 1003 or other buffer memory may be implemented via each of vision processing units 1002. Furthermore, each of vision processing units 1002 may include a central processor or controller to provide operations discussed with respect to VPU framework 120 and/or control of the hardware modules of each of vision processing units 1002. For example, each of vision processing units 1002 may include circuitry dedicated to perform encryption, decryption, video encode, video decode, machine learning inference, etc. partitioned as discussed herein.

Host central processor 1001 may include any number and type of processing units or modules that may provide control and other high level functions for system 1000 and/or operations discussed herein with respect to host framework 106. Memory 1003 may be any type of memory such as volatile memory (e.g., Static Random Access Memory (SRAM), Dynamic Random Access Memory (DRAM), etc.). In a non-limiting example, memory 1003 may be implemented by cache memory. In an embodiment, at least some portions of vision processing units 1002 are implemented via an execution unit (EU) of each of vision processing units 1002. The EU may include, for example, programmable logic or circuitry such as a logic core or cores that may provide a wide array of programmable logic functions. In an embodiment, at least some portions of vision processing units 1002 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 begins at operation 901, where an encrypted bitstream representative of protected video content is received via a vision processing unit. Process 900 may be implemented via any suitable device, system, or architecture discussed herein. The encrypted bitstream may be encrypted using any cryptographic techniques and video encoded using any suitable format.

In some embodiments, a vision processing unit for performing artificial intelligence on protected video content includes a memory buffer and one or more of a video decode processor (e.g., video decode hardware), a security engine (e.g., security engine hardware), and a neural network processor (e.g., neural network hardware). In some embodiments, a network video recorder system includes a host and a vision processing unit including a memory buffer, such that the host is only coupled to the vision processing unit by the memory buffer, a security engine, a video decode processor, and a neural network processor.

Processing continues at operation 902, where the encrypted bitstream is decrypted based on a digital rights management key corresponding thereto, the decrypted bitstream is decoded to generate video including at least one video frame, the video is encrypted based on a local key, and the encrypted video is stored to memory a memory buffer. As discussed, a host may only have access to the memory buffer of the vision processing unit and, therefore, only encrypted data corresponding to the protected video content may be stored to the memory buffer. In some embodiments, decrypting the encrypted bitstream is performed via a video decode processor of the vision processing unit providing the encrypted bitstream to a security engine of the vision processing unit via a direct memory access for the security engine to perform said decryption. In some embodiments, decrypting the encrypted bitstream is performed via a video decode processor of the vision processing unit importing functionalities of the security engine for the security engine to perform the decryption. In some embodiments, encryption and decryption may be performed by the security engine with the video decode processor providing the data for encryption and decryption via direct memory access so that any decrypted data is secure.

Processing continues at operation 903, where the encrypted video is retrieved from the memory buffer, the encrypted video is decrypted via a neural network processor of the vision processing unit based on the local key, and a neural network is applied via the neural network processor to the decrypted video to generate one or more artificial intelligence parameters corresponding to the at least one video frame. The encrypted video may be decrypted and the neural network may be applied via the neural network processor to generate the artificial intelligence parameters using any techniques discussed herein such that no unencrypted video data is stored to the memory buffer.

In some embodiments, decrypting the encrypted video via the neural network processor includes an advanced encryption standard module of the neural network processor to import functionalities of a security engine of the vision processing unit via direct memory access for the security engine to perform said decryption. In some embodiments, decryption by the security engine is only accessible by direct memory access using a channel dedicated to advanced encryption standard modules of the vision processing unit. In some embodiments, applying the neural network via the neural network processor is performed by one or more neural network sub-processors of the neural network processor, and the advanced encryption standard module and the one or more neural network sub-processors are tightly coupled such that the decrypted video is provided directly from the advanced encryption standard module to the one or more neural network sub-processors, no other component of the vision processing unit may access the decrypted video, and the decrypted video is not stored to the memory. In some embodiments, the decrypted video is discarded after processing via the one or more neural network sub-processors.

In some embodiments, decrypting the encrypted video via the neural network processor includes accessing a security engine of the vision processing unit via direct memory access, the security engine to provide the local key or a representation thereof to the neural network processor for the neural network processor to perform said decryption, such that key retrieval from the security engine is only accessible by direct memory access using a channel dedicated to one or more advanced encryption standard modules or engines of the vision processing unit. In some embodiments, decrypting the encrypted video via the neural network processor is performed by an advanced encryption standard engine of the neural network processor and applying the neural network via the neural network is performed by one or more neural network sub-processors, such that the advanced encryption standard engine and the one or more neural network sub-processors are tightly coupled such that the decrypted video is provided directly from the advanced encryption standard engine to the one or more neural network sub-processors, no other component of the vision processing unit may access the decrypted video, and the decrypted video is not stored to accessible memory. In some embodiments, the decrypted video is discarded after processing via the one or more neural network sub-processors. In some embodiments, decrypting the encrypted bitstream is performed by a second advanced encryption standard engine of a video decode processor of the vision processing unit and decoding the decrypted bitstream is performed by a video decode engine of the video decode processor, such that the second advanced encryption standard engine and the video decode processor are tightly coupled such that the decrypted bitstream is provided directly from the second advanced encryption standard engine to the video decode engine, no other component of the vision processing unit may access the decrypted bitstream, and the decrypted bitstream is not stored to accessible memory.

In some embodiments, the memory buffer is accessible to a host communicatively coupled to the memory and the host is not communicatively coupled to any other component of the vision processing unit such that the host and the hardware of the vision processing unit are not communicatively coupled other than through the memory buffer. In some embodiments, the encrypted bitstream is further stored to the memory buffer and no unencrypted data corresponding to the protected video content is stored to the memory buffer. In some embodiments, the vision processing unit provides an advanced encryption standard trusted execution environment having a hardware separation via the memory from any process running on the host. In some embodiments, the vision processing unit is one of multiple vision processing units communicatively coupled to a host, each of the vision processing units to provide an advanced encryption standard trusted execution environment for protected video content. In some embodiments, the vision processing units and the host are implemented via a network video recorder in a single housing.

Processing continues at operation 904, where the one or more artificial intelligence parameters are transmitted. The artificial intelligence parameters may be transmitted from the vision processing unit to the memory buffer (in an unencrypted format) such that the host may access artificial intelligence parameters via access to the memory buffer.

Process 900 may be repeated any number of times either in series or in parallel for any number of encrypted video streams. Process 900 may provide for artificial intelligence inference parameters or data that correspond to each video frame represented by an encrypted bitstream. The techniques discussed herein allow for security of the video content while accelerating artificial intelligence inference. As discussed, such techniques may be applied in the context of a network video recorder. However, such techniques may be applied in any suitable context via any suitable form factor device or devices.

Process 900 may be implemented by any suitable device(s), system(s), or platform(s) such as those discussed herein. In an embodiment, at least a portion of process 900 is implemented by a vision processing unit having a memory buffer that is the only way by which a host may communicate with the vision processing unit. For example, the vision processing unit may receive the encrypted bitstream via the memory buffer, decrypt the encrypted bitstream based on a digital rights management key corresponding thereto, decode the decrypted bitstream to generate video comprising at least one video frame, encrypt the video based on a local key, and store the encrypted video to the memory buffer, and retrieve the encrypted video from the memory buffer, decrypt the encrypted video via a neural network processor of the vision processing unit based on the local key, and apply a neural network via the neural network processor to the decrypted video to generate one or more artificial intelligence parameters corresponding to the at least one video frame. In an embodiment, at least a portion of process 900 is implemented by a network video recorder system including a host to receive an encrypted bitstream from one of a plurality of cameras and a vision processing unit coupled to the host via only a memory buffer of the vision processing unit, the vision processing unit further including a security engine to decrypt the encrypted bitstream based on a digital rights management key corresponding thereto, a video decode processor to decode the decrypted bitstream to generate video comprising at least one video frame, the security engine to encrypt the video based on a local key and to store the encrypted video to the memory buffer, and a neural network processor to retrieve the encrypted video from the memory buffer, decrypt the encrypted video via a direct memory access to the security engine and to apply a neural network to the decrypted video to generate one or more artificial intelligence parameters corresponding to the at least one video frame. The vision processing unit and the network video recorder system may further perform any functions or have any characteristics as discussed with respect to process 900 or elsewhere herein.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein.

The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
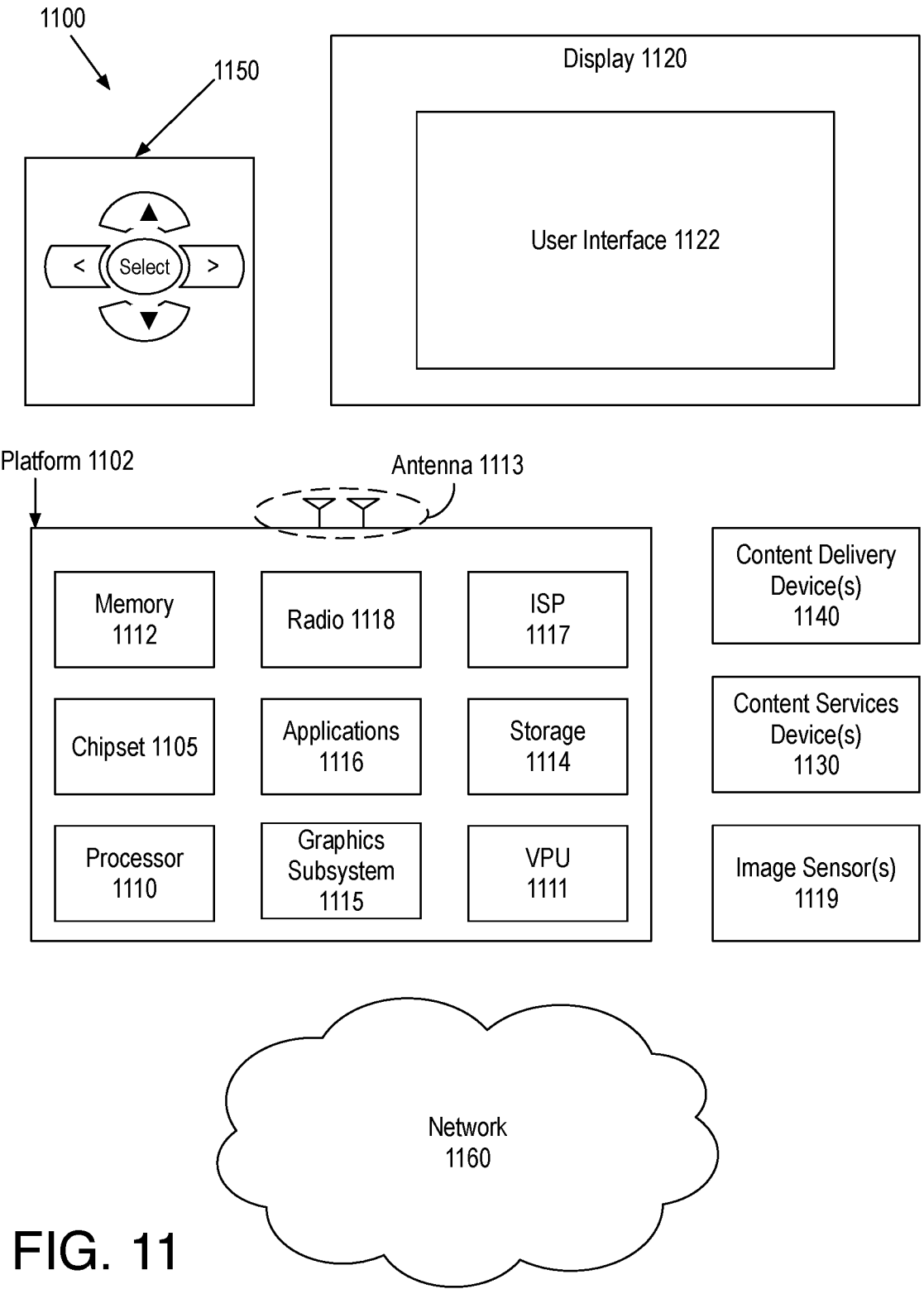
FIG. 11 is an illustrative diagram of an example system.

FIG. 11 is an illustrative diagram of an example system 1100, arranged in accordance with at least some implementations of the present disclosure. In various implementations, system 1100 may be a mobile device system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1100 includes a platform 1102 coupled to a display 1120. Platform 1102 may receive content from a content device such as content services device(s) 1130 or content delivery device(s) 1140 or other content sources such as image sensors 1119. For example, platform 1102 may receive image data as discussed herein from image sensors 1119 or any other content source. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117, vision processing unit 1111, and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Vision processing unit 1111 may be implemented as a specialized video coding and machine learning processor. In some examples, vision processing unit 1111 may be implemented as specialized processors to accelerate encode, decode, and application of machine learning algorithms such as DNNs, CNNs, etc. In some embodiments, vision processing unit 1111 may be implemented based on a system on a chip architecture and/or based on an architecture having an isolated security engine.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

Image sensors 1119 may include any suitable image sensors that may provide image data based on a scene. For example, image sensors 1119 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1119 may include any device that may detect information of a scene to generate image data.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
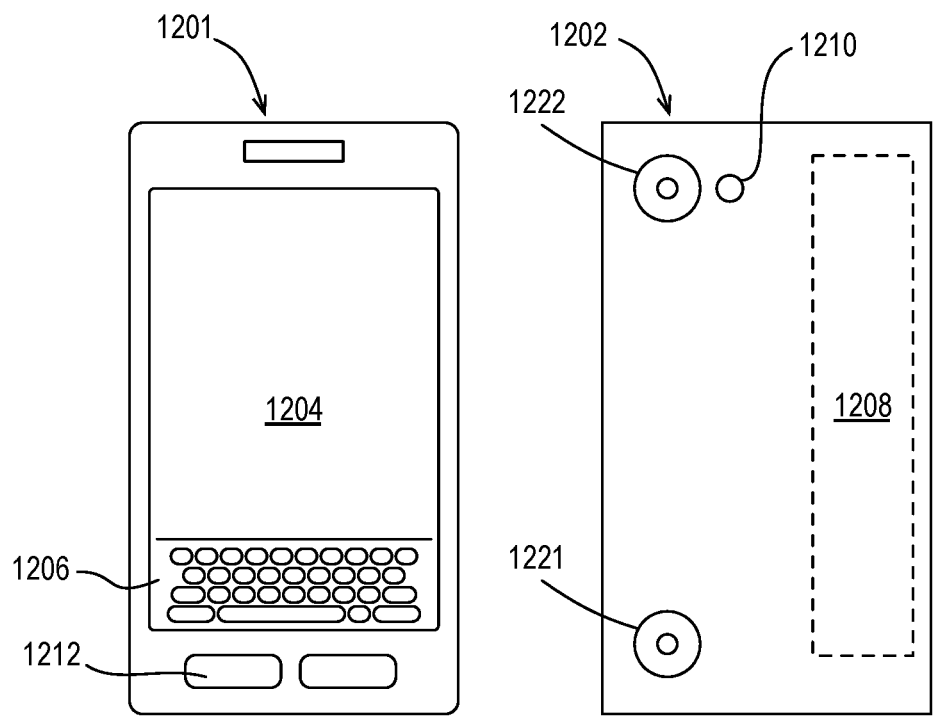
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other systems, components, or modules discussed herein or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, a color camera 1221, a color camera 1222, and an integrated antenna 1208. In some embodiments, color camera 1221 and color camera 1222 attain planar images as discussed herein. In some embodiments, device 1200 does not include color camera 1221 and 1222 and device 1200 attains input image data (e.g., any input image data discussed herein) from another device. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include color cameras 1221, 1222, and a flash 1210 integrated into back 1202 (or elsewhere) of device 1200. In other examples, color cameras 1221, 1222, and flash 1210 may be integrated into front 1201 of device 1200 or both front and back sets of cameras may be provided. Color cameras 1221, 1222 and a flash 1210 may be components of a camera module to originate color image data with IR texture correction that may be processed into an image or streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, vision processing unit for performing artificial intelligence on protected video content comprises a memory buffer to store an encrypted bitstream representative of protected video content, the vision processing unit to receive the encrypted bitstream via the memory buffer, decrypt the encrypted bitstream based on a digital rights management key corresponding thereto, decode the decrypted bitstream to generate video comprising at least one video frame, encrypt the video based on a local key, and store the encrypted video to the memory buffer, and retrieve the encrypted video from the memory buffer, decrypt the encrypted video via a neural network processor of the vision processing unit based on the local key, and apply a neural network via the neural network processor to the decrypted video to generate one or more artificial intelligence parameters corresponding to the at least one video frame.

In one or more second embodiments, further to the first embodiments, the vision processing unit to decrypt the encrypted video via the neural network processor comprises an advanced encryption standard module of the neural network processor to import functionalities of a security engine of the vision processing unit via direct memory access for the security engine to perform said decryption.

In one or more third embodiments, further to the first or second embodiments, said decryption by the security engine is only accessible by direct memory access using a channel dedicated to advanced encryption standard modules of the vision processing unit.

In one or more fourth embodiments, further to the first through third embodiments, the neural network processor comprises a plurality of neural network sub-processors to apply the neural network, and the advanced encryption standard module and the neural network sub-processors are tightly coupled such that the decrypted video is provided directly from the advanced encryption standard module to the neural network sub-processors, no other component of the vision processing unit may access the decrypted video, and the decrypted video is not stored to the memory buffer, and the decrypted video is discarded after processing via the neural network sub-processors.

In one or more fifth embodiments, further to the first through fourth embodiments, the vision processing unit to decrypt the encrypted bitstream is performed via a video decode processor of the vision processing unit accessing functionalities of the security engine of the vision processing unit via a second direct memory access for the security engine to perform said decryption.

In one or more sixth embodiments, further to the first through fifth embodiments, the vision processing unit to decrypt the encrypted video via the neural network processor comprises the neural network processor to access a security engine of the vision processing unit via direct memory access, the security engine to provide the local key or data corresponding thereto to the neural network processor for the neural network processor to perform said decryption, and key retrieval from the security engine is only accessible by direct memory access using a channel dedicated to one or more advanced encryption standard modules or engines of the vision processing unit.

In one or more seventh embodiments, further to the first through sixth embodiments, the vision processing unit to decrypt the encrypted video via the neural network processor comprises an advanced encryption standard engine of the neural network processor to perform the decryption, the neural network processor to apply the neural network is performed by a plurality of neural network sub-processors of the neural network processor, and the advanced encryption standard engine and the one or more neural network sub-processors are tightly coupled such that the decrypted video is provided directly from the advanced encryption standard engine to the one or more neural network sub-processors, no other component of the vision processing unit may access the decrypted video, and the decrypted video is not stored to accessible memory, and the decrypted video is discarded after processing via the one or more neural network sub-processors.

In one or more eighth embodiments, further to the first through seventh embodiments, the vision processing unit to decrypt the encrypted bitstream is performed by a second advanced encryption standard engine of a video decode processor of the vision processing unit, the vision processing unit to decode the decrypted bitstream is performed by a video decode engine of the video decode processor, and the second advanced encryption standard engine and the video decode processor are tightly coupled such that the decrypted bitstream is provided directly from the second advanced encryption standard engine to the video decode engine, no other component of the vision processing unit may access the decrypted bitstream, and the decrypted bitstream is not stored to accessible memory.

In one or more ninth embodiments, further to the first through eighth embodiments, the memory buffer is accessible to a host communicatively coupled to the memory buffer, the host is not communicatively coupled to any other component of the vision processing unit such that the host and the vision processing unit are not communicatively coupled other than through the memory buffer, the encrypted bitstream is further stored to the memory buffer, and no unencrypted data corresponding to the protected video content is stored to the memory buffer.

In one or more tenth embodiments, further to the first through ninth embodiments, the vision processing unit comprises an advanced encryption standard trusted execution environment having a hardware separation via the memory buffer from any process running on the host.

In one or more eleventh embodiments, further to the first through tenth embodiments, the vision processing unit is one of a plurality of vision processing units communicatively coupled to a host, each of the vision processing units to provide an advanced encryption standard trusted execution environment for protected video content, and the vision processing units and the host are implemented via a network video recorder in a single housing.

In one or more twelfth embodiments, a network video recorder system comprises a host to receive an encrypted bitstream from one of a plurality of cameras and a vision processing unit coupled to the host via only a memory buffer of the vision processing unit, the vision processing unit further comprising a security engine to decrypt the encrypted bitstream based on a digital rights management key corresponding thereto, a video decode processor to decode the decrypted bitstream to generate video comprising at least one video frame, the security engine to encrypt the video based on a local key and to store the encrypted video to the memory buffer, and a neural network processor to retrieve the encrypted video from the memory buffer, decrypt the encrypted video via a direct memory access to the security engine and to apply a neural network to the decrypted video to generate one or more artificial intelligence parameters corresponding to the at least one video frame.

In one or more thirteenth embodiments, further to the twelfth embodiments, the neural network processor to decrypt the encrypted video comprises an advanced encryption standard module of the neural network processor to import functionalities of a security engine of the vision processing unit via direct memory access for the security engine to perform said decryption, and said import of functionalities is only accessible by direct memory access using a dedicated channel.

In one or more fourteenth embodiments, further to the twelfth or thirteenth embodiments, the neural network processor comprises a plurality of neural network sub-processors to apply the neural network, and the advanced encryption standard module and the neural network sub-processors are tightly coupled such that the decrypted video is provided directly from the advanced encryption standard module to the neural network sub-processors, no other component of the vision processing unit may access the decrypted video, and the decrypted video is not stored to the memory buffer, and the decrypted video is discarded after processing via the neural network sub-processors.

In one or more fifteenth embodiments, further to the twelfth through fourteenth embodiments, the security engine to decrypt the encrypted bitstream comprises a second advanced encryption standard module of the video decode processor to import functionalities of the security engine via a second direct memory access.

In one or more sixteenth embodiments, further to the twelfth through fifteenth embodiments, network video recorder system further comprises a plurality of second vision processing units communicatively coupled to a host, the vision processing unit and each of the second vision processing units to provide an advanced encryption standard trusted execution environment for protected video content.

In one or more seventeenth embodiments, a method for performing artificial intelligence on protected video content comprises receiving, via a vision processing unit, an encrypted bitstream representative of protected video content, decrypting the encrypted bitstream based on a digital rights management key corresponding thereto, decoding the decrypted bitstream to generate video comprising at least one video frame, encrypting the video based on a local key, and storing the encrypted video to memory, and retrieving the encrypted video from the memory, decrypting the encrypted video via a neural network processor of the vision processing unit based on the local key, and applying a neural network via the neural network processor to the decrypted video to generate one or more artificial intelligence parameters corresponding to the at least one video frame.

In one or more eighteenth embodiments, further to the seventeenth embodiments, said decrypting the encrypted video via the neural network processor comprises an advanced encryption standard module of the neural network processor to import functionalities of a security engine of the vision processing unit via direct memory access for the security engine to perform said decryption.

In one or more nineteenth embodiments, further to the seventeenth or eighteenth embodiments, said decryption by the security engine is only accessible by direct memory access using a channel dedicated to advanced encryption standard modules of the vision processing unit.

In one or more twentieth embodiments, further to the seventeenth through nineteenth embodiments, said applying the neural network via the neural network processor is performed by one or more neural network sub-processors, and the advanced encryption standard module and the one or more neural network sub-processors are tightly coupled such that the decrypted video is provided directly from the advanced encryption standard module to the one or more neural network sub-processors, no other component of the vision processing unit may access the decrypted video, and the decrypted video is not stored to the memory, and the decrypted video is discarded after processing via the one or more neural network sub-processors.

In one or more twenty-first embodiments, a device or system includes a memory and a processor to perform a method according to any one of the above embodiments and having any of the characteristics of the above embodiments.

In one or more twenty-second embodiments, at least one machine readable medium includes a plurality of instructions that in response to being executed on a computing device, cause the computing device to perform a method according to any one of the above embodiments and having any of the characteristics of the above embodiments.

In one or more twenty-third embodiments, an apparatus may include means for performing a method according to any one of the above embodiments and having any of the characteristics of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for performing artificial intelligence on protected video content, comprising:
a vision processing unit; and
a memory to store an encrypted bitstream representative of protected video content, the vision processing unit to:
receive the encrypted bitstream via the memory;
decrypt the encrypted bitstream based on a digital rights management key corresponding thereto, decode the decrypted bitstream to generate video comprising at least one video frame, encrypt the video based on a local key, and store the encrypted video to the memory; and
retrieve the encrypted video from the memory, decrypt the encrypted video via a neural network processor of the vision processing unit based on the local key, and apply a neural network via the neural network processor to the decrypted video to generate one or more artificial intelligence parameters corresponding to the at least one video frame.

2. The system of claim 1, wherein the vision processing unit to decrypt the encrypted video via the neural network processor comprises an advanced encryption standard module of the neural network processor to import functionalities of a security engine of the vision processing unit via direct memory access for the security engine to perform said decryption.

3. The system of claim 2, wherein said decryption by the security engine is only accessible by direct memory access using a channel dedicated to advanced encryption standard modules of the vision processing unit.

4. The system of claim 3, wherein the neural network processor comprises a plurality of neural network sub-processors to apply the neural network, and wherein the advanced encryption standard module and the neural network sub-processors are tightly coupled such that the decrypted video is provided directly from the advanced encryption standard module to the neural network sub-processors, no other component of the vision processing unit may access the decrypted video, and the decrypted video is not stored to the memory, and wherein the decrypted video is discarded after processing via the neural network sub-processors.

5. The system of claim 3, wherein the vision processing unit to decrypt the encrypted bitstream is performed via a video decode processor of the vision processing unit accessing functionalities of the security engine of the vision processing unit via a second direct memory access for the security engine to perform said decryption.

6. The system of claim 1, wherein the vision processing unit to decrypt the encrypted video via the neural network processor comprises the neural network processor to access a security engine of the vision processing unit via direct memory access, the security engine to provide the local key or data corresponding thereto to the neural network processor for the neural network processor to perform said decryption, and wherein key retrieval from the security engine is only accessible by direct memory access using a channel dedicated to one or more advanced encryption standard modules or engines of the vision processing unit.

7. The system of claim 1, wherein the vision processing unit to decrypt the encrypted video via the neural network processor comprises an advanced encryption standard engine of the neural network processor to perform the decryption, wherein the neural network processor to apply the neural network is performed by one or more neural network sub-processors of the neural network processor, and wherein the advanced encryption standard engine and the one or more neural network sub-processors are tightly coupled such that the decrypted video is provided directly from the advanced encryption standard engine to the one or more neural network sub-processors, no other component of the vision processing unit may access the decrypted video, and the decrypted video is not stored to accessible memory, and wherein the decrypted video is discarded after processing via the one or more neural network sub-processors.

8. The system of claim 7, wherein the vision processing unit to decrypt the encrypted bitstream is performed by a second advanced encryption standard engine of a video decode processor of the vision processing unit, wherein the vision processing unit to decode the decrypted bitstream is performed by a video decode engine of the video decode processor, and wherein the second advanced encryption standard engine and the video decode processor are tightly coupled such that the decrypted bitstream is provided directly from the second advanced encryption standard engine to the video decode engine, no other component of the vision processing unit may access the decrypted bitstream, and the decrypted bitstream is not stored to accessible memory.

9. The system of claim 1, wherein the memory is accessible to a host communicatively coupled to the memory, the host is not communicatively coupled to any other component of the vision processing unit such that the host and the vision processing unit are not communicatively coupled other than through the memory, the encrypted bitstream is further stored to the memory, and wherein no unencrypted data corresponding to the protected video content is stored to the memory.

10. The system of claim 9, wherein the vision processing unit comprises an advanced encryption standard trusted execution environment having a hardware separation via the memory from any process running on the host.

11. The system of claim 1, wherein the vision processing unit is one of a plurality of vision processing units communicatively coupled to a host, each of the vision processing units to provide an advanced encryption standard trusted execution environment for protected video content, and wherein the vision processing units and the host are implemented via a network video recorder in a single housing.

12. A network video recorder system, comprising:
a host to receive an encrypted bitstream from one of a plurality of cameras;
a vision processing unit; and
a memory, wherein the vision processing unit is coupled to the host via only the memory, the vision processing unit comprising:
a security engine to decrypt the encrypted bitstream based on a digital rights management key corresponding thereto;
a video decode processor to decode the decrypted bitstream to generate video comprising at least one video frame, the security engine to encrypt the video based on a local key and to store the encrypted video to the memory; and
a neural network processor to retrieve the encrypted video from the memory, decrypt the encrypted video via a direct memory access to the security engine and to apply a neural network to the decrypted video to generate one or more artificial intelligence parameters corresponding to the at least one video frame.

13. The network video recorder system of claim 12, wherein the neural network processor to decrypt the encrypted video comprises an advanced encryption standard module of the neural network processor to import functionalities of a security engine of the vision processing unit via direct memory access for the security engine to perform said decryption, wherein said import of functionalities is only accessible by direct memory access using a dedicated channel.

14. The network video recorder system of claim 13, wherein the neural network processor comprises a plurality of neural network sub-processors to apply the neural network, and wherein the advanced encryption standard module and the neural network sub-processors are tightly coupled such that the decrypted video is provided directly from the advanced encryption standard module to the neural network sub-processors, no other component of the vision processing unit may access the decrypted video, and the decrypted video is not stored to the memory, and wherein the decrypted video is discarded after processing via the neural network sub-processors.

15. The network video recorder system of claim 14, wherein the security engine to decrypt the encrypted bitstream comprises a second advanced encryption standard module of the video decode processor to import functionalities of the security engine via a second direct memory access.

16. The network video recorder system of claim 12, further comprising:
a plurality of second vision processing units communicatively coupled to a host, the vision processing unit and each of the second vision processing units to provide an advanced encryption standard trusted execution environment for protected video content.

17. A method for performing artificial intelligence on protected video content comprising:
receiving, via a vision processing unit, an encrypted bitstream representative of protected video content;
decrypting the encrypted bitstream based on a digital rights management key corresponding thereto, decoding the decrypted bitstream to generate video comprising at least one video frame, encrypting the video based on a local key, and storing the encrypted video to memory; and retrieving the encrypted video from the memory, decrypting the encrypted video via a neural network processor of the vision processing unit based on the local key, and applying a neural network via the neural network processor to the decrypted video to generate one or more artificial intelligence parameters corresponding to the at least one video frame.

18. The method of claim 17, wherein said decrypting the encrypted video via the neural network processor comprises an advanced encryption standard module of the neural network processor to import functionalities of a security engine of the vision processing unit via direct memory access for the security engine to perform said decryption.

19. The method of claim 18, wherein said decryption by the security engine is only accessible by direct memory access using a channel dedicated to advanced encryption standard modules of the vision processing unit.

20. The method of claim 19, wherein said applying the neural network via the neural network processor is performed by one or more neural network sub-processors, and the advanced encryption standard module and the one or more neural network sub-processors are tightly coupled such that the decrypted video is provided directly from the advanced encryption standard module to the one or more neural network sub-processors, no other component of the vision processing unit may access the decrypted video, and the decrypted video is not stored to the memory, and wherein the decrypted video is discarded after processing via the one or more neural network sub-processors.

\* \* \* \* \*